(12) United States Patent
Holatz

(10) Patent No.: US 11,429,922 B2
(45) Date of Patent: Aug. 30, 2022

(54) CLUSTER-BASED CONTAINER LIFECYCLE TRACKER

(71) Applicant: Raquel Holatz, Santa Catarina (BR)

(72) Inventor: Raquel Holatz, Santa Catarina (BR)

(73) Assignee: Raquel Holatz, Brusque (BR)

( * ) Notice: Subject to any disclaimer, the term of this patent is extended or adjusted under 35 U.S.C. 154(b) by 558 days.

(21) Appl. No.: 16/447,741

(22) Filed: Jun. 20, 2019

(65) Prior Publication Data

US 2019/0392385 A1    Dec. 26, 2019

Related U.S. Application Data

(60) Provisional application No. 62/688,267, filed on Jun. 21, 2018.

(51) Int. Cl.

| | |
|---|---|
| *H04N 5/77* | (2006.01) |
| *G06Q 10/08* | (2012.01) |
| *H04W 4/029* | (2018.01) |
| *H04L 61/5007* | (2022.01) |
| *H04L 9/40* | (2022.01) |
| *H04N 7/18* | (2006.01) |
| *H04N 9/80* | (2006.01) |
| *H04L 101/622* | (2022.01) |

(52) U.S. Cl.
CPC ..... *G06Q 10/0833* (2013.01); *G06Q 10/0831* (2013.01); *H04L 61/2007* (2013.01); *H04L 63/0442* (2013.01); *H04N 7/185* (2013.01); *H04N 7/188* (2013.01); *H04W 4/029* (2018.02); *H04L 61/6022* (2013.01)

(58) Field of Classification Search
USPC .................................... 386/224, 227, 248
See application file for complete search history.

(56) References Cited

U.S. PATENT DOCUMENTS

| | | | | |
|---|---|---|---|---|
| 7,455,225 B1 * | 11/2008 | Hadfield | ................. | G07C 5/085 |
| | | | | 235/384 |
| 9,151,692 B2 * | 10/2015 | Breed | ..................... | B60C 11/24 |
| 9,349,270 B1 * | 5/2016 | Crossno | ............. | G06Q 10/0833 |
| 9,630,545 B1 * | 4/2017 | Corrigan | .................. | B60P 1/44 |
| 10,242,333 B1 * | 3/2019 | Colucci, III | ......... | G06Q 10/083 |
| 10,305,532 B1 * | 5/2019 | Jantzi | ................... | H04B 1/0458 |
| 10,861,052 B1 * | 12/2020 | Lopez | ................ | G06Q 30/0277 |
| 10,862,840 B2 * | 12/2020 | Claux | ..................... | H04L 67/02 |
| 11,304,045 B1 * | 4/2022 | Pallapa | ................... | H04W 4/90 |

(Continued)

*Primary Examiner* — Nigar Chowdhury

(74) *Attorney, Agent, or Firm* — Hogan Lovells US LLP

(57) ABSTRACT

The disclosure is related to monitoring integrity of cargo in a container on a trans-oceanic voyage and cargo on truck or trains. The method includes determining, by a trigger from at least one remote processor, that a system including the at least one remote processor in a network with at least one local processor is activated by an opening or a closing of a container door. At least one environment camera is activated to provide an environment media. At least one data retrieving component is activated to retrieve and to provide data associated with a tracking marker of cargo associated with the container. At least one satellite receiver is activated to receive location information for the at least one local processor. One or more of the environment media, the data, and the location information is packaged for a bit stream. The bit stream is communicated to a remote device.

20 Claims, 6 Drawing Sheets

(56) References Cited

U.S. PATENT DOCUMENTS

| | | | |
|---|---|---|---|
| 2005/0248456 A1* | 11/2005 | Britton | G08B 13/2462 340/539.29 |
| 2006/0291657 A1* | 12/2006 | Benson | G06F 21/52 380/270 |
| 2007/0133980 A1* | 6/2007 | Meyers | G08B 13/19669 396/429 |
| 2008/0042842 A1* | 2/2008 | Ulibarri | G06Q 10/08 340/572.1 |
| 2009/0015400 A1* | 1/2009 | Breed | B60R 21/01546 340/539.22 |
| 2010/0328031 A1* | 12/2010 | Powers | G08B 25/10 340/5.64 |
| 2012/0050531 A1* | 3/2012 | Wu | G08B 13/19697 348/143 |
| 2013/0027556 A1* | 1/2013 | Clark | G08B 21/24 348/148 |
| 2013/0033381 A1* | 2/2013 | Breed | B60T 7/16 340/568.1 |
| 2014/0201094 A1* | 7/2014 | Herrington | G06Q 30/018 705/317 |
| 2015/0095255 A1* | 4/2015 | Hall | G06Q 10/0833 705/333 |
| 2015/0119081 A1* | 4/2015 | Ayoob | H04W 64/00 455/456.3 |
| 2015/0192679 A1* | 7/2015 | Stinson | G01S 19/14 342/357.51 |
| 2015/0254603 A1* | 9/2015 | Bashkin | A47B 57/06 312/237 |
| 2016/0050356 A1* | 2/2016 | Nalepka | G06K 9/00791 348/148 |
| 2017/0200197 A1* | 7/2017 | Brubaker | G09F 21/048 |
| 2017/0313269 A1* | 11/2017 | Breed | B60R 21/01526 |
| 2018/0060814 A1* | 3/2018 | Seaman | G06Q 10/0838 |
| 2018/0091782 A1* | 3/2018 | Bashkin | G07C 9/00563 |
| 2018/0122118 A1* | 5/2018 | Dotterweich | G06Q 10/0838 |
| 2018/0328079 A1* | 11/2018 | Lim | H04W 4/80 |
| 2018/0365501 A1* | 12/2018 | Seaman | G07C 5/008 |
| 2018/0367872 A1* | 12/2018 | Lucrecio | G06Q 50/28 |
| 2019/0028903 A1* | 1/2019 | Carpenter | H04W 16/26 |
| 2019/0268585 A1* | 8/2019 | Bell | G06K 9/00798 |

\* cited by examiner

CLUSTER-BASED CONTAINER LIFECYCLE TRACKER

RELATED APPLICATION

The present disclosure is related to and claims priority from U.S. Provisional Application 62/688,267, titled CLUSTER-BASED CONTAINER LIFECYCLE TRACKER, filed on Jun. 21, 2018, the entirety of the disclosure of which is incorporated by reference herein.

BACKGROUND

Containers used in trans-oceanic shipping contain valuable cargo that is subject to sophisticated thefts, scams, and to, subsequently, complicated insurance claim processes. For example, there are many stages from when the cargo is received for shipping till when the cargo is delivered at its destination. While bill of lading, seals, and other processes are in place to provide some form of security and tracking to the cargo at each transfer stage, there are many instances of disappearance of cargo with a perfect bill of lading and with the seals on a container lock intact. There have also been instances of theft on high seas, with vessel-to-vessel transfer of cargo from within a container with the container then returned to their initial condition. In the end, merely securing and tracking cargo at each transfer stage with seals, locks, and a bill or receipt, even if provided in soft copy and by scanning at each transfer stage, still does not ensure secure passage for the cargo. Moreover, losses resulting from such theft or scams take months or years of investigation to rule out improprieties and to receive insurance payouts.

BRIEF DESCRIPTION OF THE DRAWINGS

Various embodiments in accordance with the present disclosure will be described with reference to the drawings, in which.

DETAILED DESCRIPTION

Figure 1:
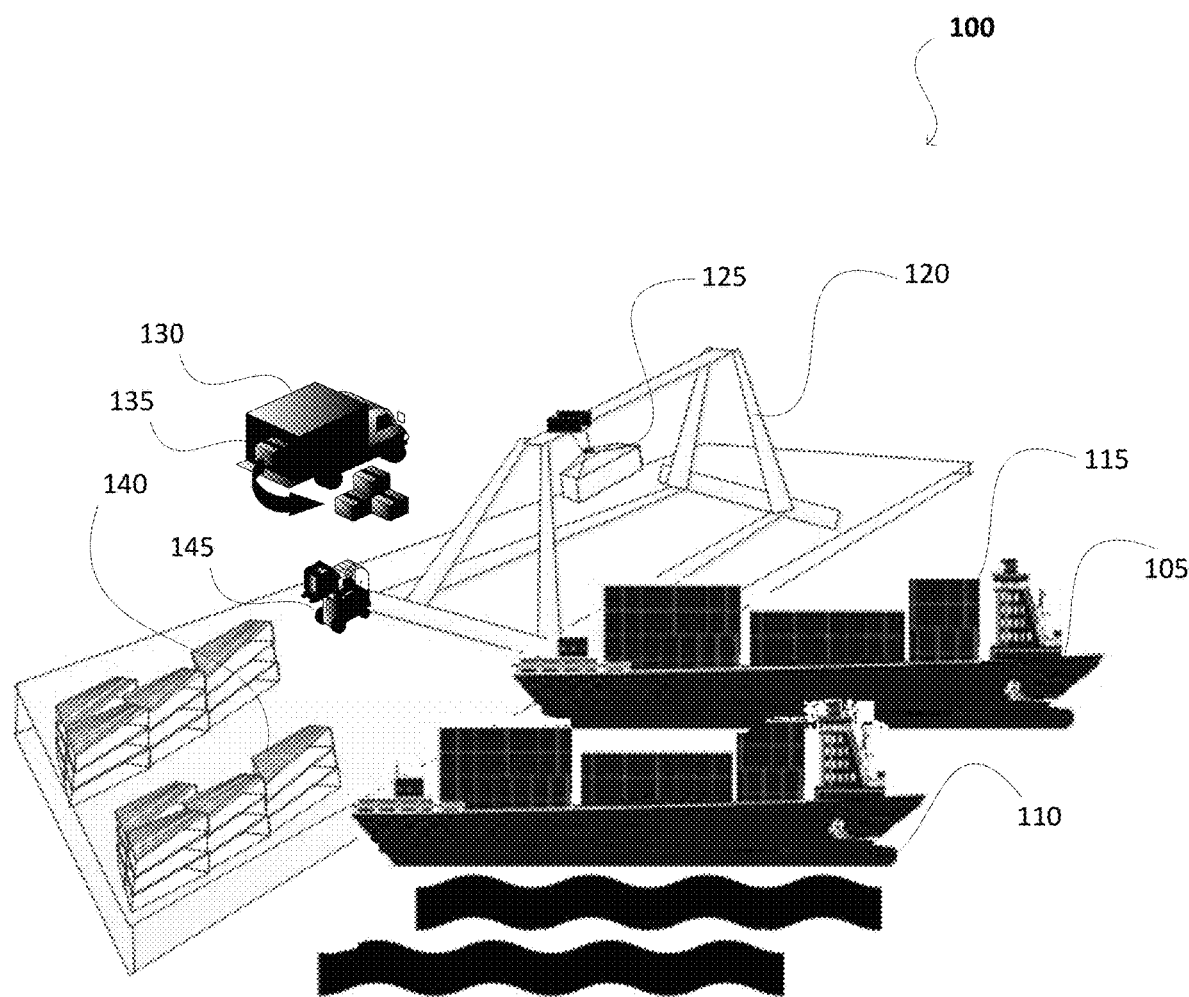
FIG. 1 illustrates a general overview of several cargo transfer stages in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to maintaining security and integrity of cargo in trans-oceanic shipping processes. In an example, a system is disclosed as including at least one local processor and at least one remote processor. The at least one local processor may be in one container of a cluster of containers or may be located on a vessel transporting the cluster of containers. Further, each of the processors may be similar or may incorporate variations, but that operate in the same or similar standards so that they can communicate with each other using similar codes, for instance. Still further, each of the processors may be a part of its own system—that may be a sub-system of the above reference system—and may include one or more additional components as described herein. As such, the system may include the components of the sub-system, as they function as a cluster for most intents and purposes.

As used herein, a cluster refers to network of same or similar devices that are in a network or in a communication with each other in a manner that each of the same or similar devices can directly communicate with another one of the same or similar devices. As such, unlike certain central architecture-based networks, the cluster works to a common objective set for the same or similar devices. In another distinction generally observed, the same or similar devices in the cluster may be aware of what the other devices in the cluster are doing.

The system also includes at least one environment camera, at least one data retrieving component, at least one satellite receiver, at least one transmitter or transceiver, and at least one memory including instructions that when executed in the at least one local processor cause the system to perform functions incorporating one or more of the above-referenced hardware. For example, the functions include a determination that the system is activated by an opening or a closing of a container door. This may be by a trigger from the at least one remote processor that is detachably installed to a container, such as by a hardware or software trigger when the container door of the container is opened. Meanwhile, the at least one local processor may be on a different container and may perform similar operations as the at least one remote processor, but as to the different container on which it is detachably installed.

The functions include activation of the at least one environment camera to provide an environment media and the at least one data retrieving component to retrieve and to provide data associated with a location of the at least one remote processor—at the container, and perhaps, looking outwards but within a visual frame of the entire front area once the container door is opened. The at least one data retrieving component is also able to retrieve and to provide available data for the cargo. In this configuration, the environment media (videos, burst images, etc.) provides at least multiple burst images or a single predetermined timed image of the entire front area of the container door. In an example the at least one environment camera includes night vision, and, alternatively or along with such night vision cameras, a continuous light or flash light is provided to capture a clear view of the entire front area once the container door is open. In addition, the at least one data retrieving equipment includes semiconductor memory, such as a flash memory, for non-volatile storage that may be written over after predetermined durations. The at least one data retrieving equipment retrieves logs of timing, location, and identifier information for the container hosting the at least one data retrieving equipment and stores it in a memory. In an example, the location is transmitted for one or more of the other sub-systems in the cluster. As the cluster is generally on the same vessel, the location is to a global positioning system (GPS) location of the vessel. The environment media and the data provided to the at least one local processor.

The function at the last least one local processor include activating the at least one satellite receiver to receive location information for the at least one local processor. The at least one satellite receiver may be a fixed and/or a mobile receiver, such as a user terminal and/or a very small aperture terminal satellite (VSat). As such the use of multiple systems ensures continuous tracking as the systems are capable of switching from one to another depending on the availability of a signal. For example, the VSat provides economical tracking, which may then transfer control to a mobile communications-based tracking, such as via standard 3G, 4G, LTE, 5G, Global System for Mobile Communications (GSM®), Code Division Multiple Access (CDMA), or a satellite communication standards for communicating the bit stream. Tracking information is packaged to include one or more of the environment media, the data, and the location information. The packing incorporates the tracking information into a bit stream for use with the at least one transmitter or transceiver. A final function communicates the bit stream to a remote device when the at least one transmitter or transceiver is provided with access for the communicating.

Various other functions can be implemented within the various embodiments as well as discussed and suggested elsewhere herein.

FIG. 1 illustrates a general overview 100 of several cargo transfer stages in accordance with various embodiments. The general overview 100 is a port side view of container, cargo, craning, and shipping operations. Cargo 135 including one or more boxes or oddly shaped items may be received from truck 130 in a tagged manner. Such a tag may incorporate radio-frequency identification (RFID) for reference and tracking purposes. The RFID reader, in an example may be a Tagmaster® ETC Reader. Barcodes, including QR codes, and near field communication (NFC) tags are also applicable as reference, identification, or tracking tags for the cargo described herein and applicable for reading by the example system disclosed herein. The cargo 135 is typically then taken by forklift or other lifting devices 145 to fill a container 140. In an alternative implementation, the container is filled at the cargo location and brought to the port side for shipping. In such an implementation the present system is at least partly deployed in the container at the cargo location. Ships 105, 110 are illustrated as including newly arrived containers 115 for shipping. The containers 140, 125 may be loaded to the ships 105, 110 via gantry cranes or container cranes, e.g., 120.

Figure 2:
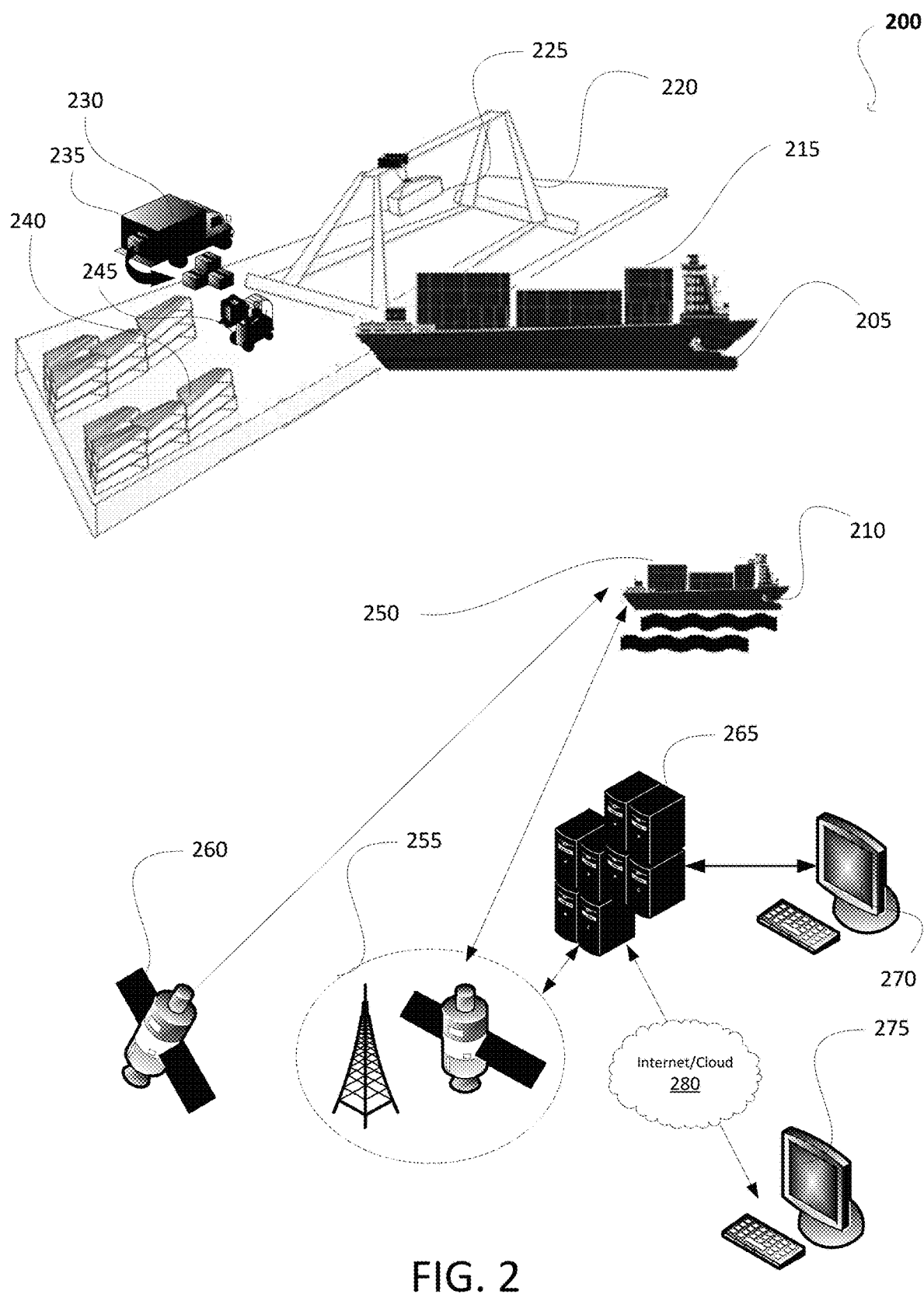
FIG. 2 illustrates an example application of a cluster-based container lifecycle tracker in accordance with various embodiments.

FIG. 2 illustrates an example application 200 of a cluster-based container lifecycle tracker in accordance with various embodiments. In FIG. 2, certain aspects of FIG. 1 are maintained, but with the addition of aspects of the present system. As in the case of FIG. 1, in FIG. 2, cargo 235 including one or more boxes or oddly shaped items may be received from truck 230 in a tagged manner. Alternatively, tags are applied at the port side operation, on arrival at the port side area. As in FIG. 1, in the same of FIG. 2, the tag may incorporate radio-frequency identification (RFID) for reference and tracking purposes. Barcodes, including QR codes, are also applicable as reference, identification, or tracking tags for the cargo 235 described herein and applicable for reading by the example system 200 disclosed herein. The cargo 235 is typically then taken by forklift or other lifting devices 245 to fill a container 240. In an alternative implementation, the container 240 is filled at the cargo location and brought to the port side for shipping. In such an implementation the present system 200 is at least partly deployed in the container at the cargo location. Ships 205, 210 are illustrated as including newly arrived containers 215, 250, for shipping. The containers 215, 225, 250 may be loaded to the ships 205, 210 via gantry cranes or container cranes, e.g., 220.

Figure 4:
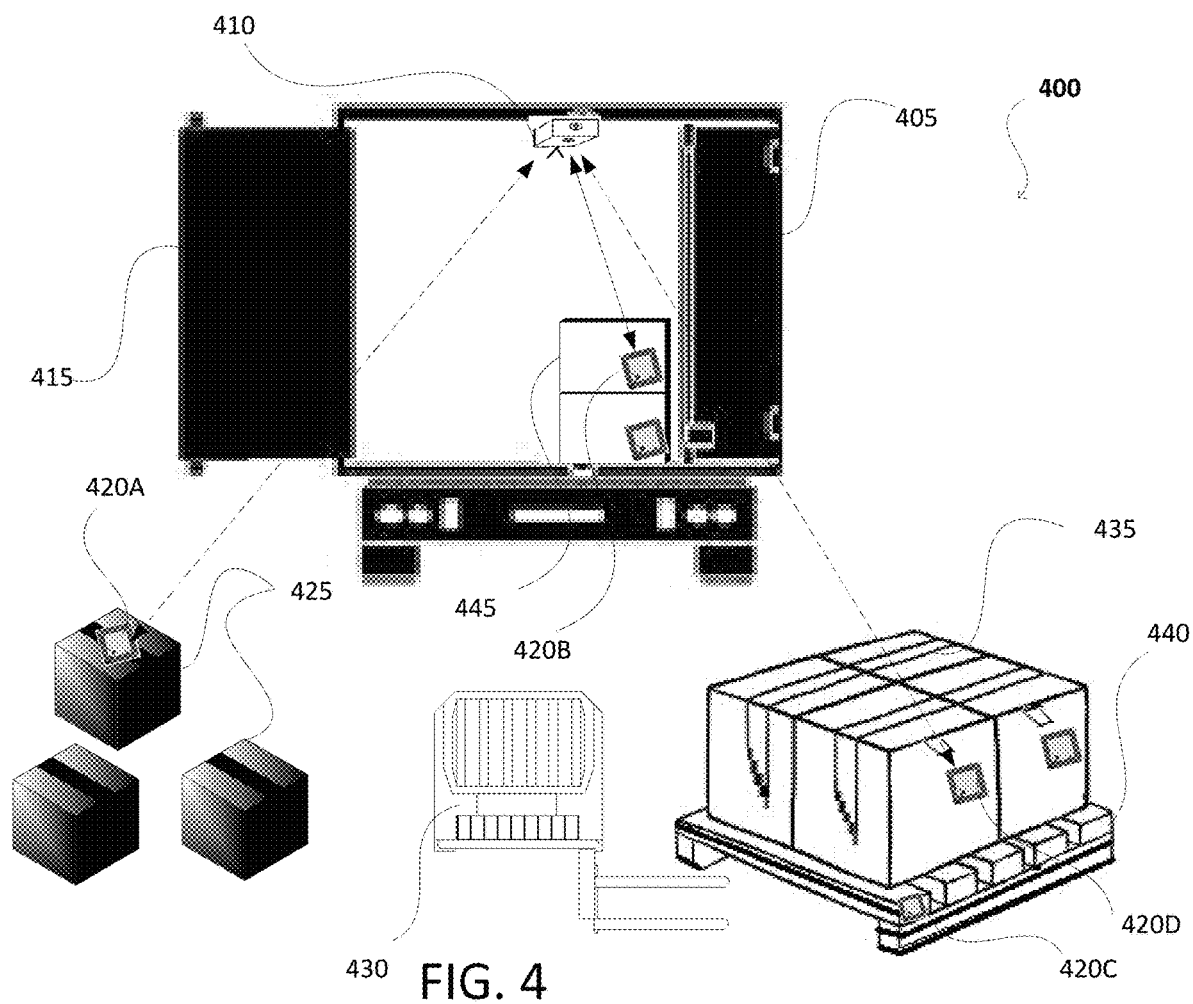
FIG. 4 illustrates an example cluster-based container lifecycle tracker installed in a container at a transfer stage and related tracking processes enabled by it, in accordance with aspects of this disclosure.

In addition, FIG. 2 illustrates that the containers shipped, e.g., container 250, in departed vessel 210 may include a sub-system of a system for cluster-based container lifecycle tracking. Particularly, the sub-system may include a device attached to the container, approximately at the container door area, and approximately on the inside portion of the container door area. For example, the sub-system may be as illustrated in FIG. 4, with the system illustrated in FIGS. 5 & 6. The system communicates with first satellite 260, antenna or second satellite 225, cloud servers 265, and one or more remote users or administrators 270, 275. First satellite 260 may be restricted to only providing location information for one more requesting devices, such as a GPS module within the system. As such, containers 250 may include one or more sub-systems, such as VSat and/or standard mobile phone communication, functioning together in a cluster network to form a single system that is supported by one or more of the components 255, 260, 265, 270, 275. Alternatively, a trigger caused by a physical change to the container (e.g., opening of a door, a latch, a change in visible light into the container may alert the system to initiate communications. In addition, one or more of the sub-systems may be provided to support both, an internal network among clustered devices, and an external network between a lead processor for one of the clustered devices to the satellite and/or VSat system. As such, latency issues from bandwidth and satellite availability in a high-communication density location may be alleviated by selection of an appropriate sub-system for communication using a software or hardware switch supported by a proximity-based protocol to determine the selection of the appropriate sub-system. In an example, as discussed elsewhere in this disclosure, a flag setting (e.g., flags 630A & 630B in FIG. 6 illustrated for understanding and is not literal as the flags may be software flags, transistor switches, or circuit jumpers) provides selection of a mobile satellite system and/or VSat over a standard mobile communication subsystem, such as GSM or CDMA (Code Division Multiple Access). The sub-systems may be polled and a rat-race of responsive signals from the polled subs-systems may be used to determine the flag setting. The polled sub-systems may be required to ping for a signal (or an antenna) and as some sub-systems may not be able to reach their corresponding antenna or find a corresponding signal for transmission, the may take longer to provide their corresponding responsive signals in the rat-rate—such as waiting till timeout of the ping to respond. A default flag, however, may be set for the mobile satellite system and/or VSat in the event that a sub-system fails to respond.

In an example, each sub-subsystem is located on one container of containers 250. The sub-system provides wireless and satellite communication for relaying information from the sub-system to each other and to remote devices outside the vessel 210. As such, the sub-system may function as a system to communicate to remote devices outside the vessel 210, but function as a sub-system for internal communications with other sub-systems, forming a cluster network. When the cluster network is operational, it forms a dynamic layout network, with each sub-system including its own internet protocol address or Media Access Control (MAC) identifier. In an example, once random containers, unassociated with each other—and from one or more different entities—are brought together, their respective sub-systems are turned on. When turned on, the sub-systems may begin polling each other till all other sub-systems within range of each other's wireless (or other communication standards) reach is exhausted. Wireless reach herein refers to the signal strength of each broadcasting sub-system. In an example, wireless standards such as a WiFi® (e.g., IEEE 802.11), wireless LAN, wireless WAN, and mobile broadband (e.g., 3G, 4G, LTE, 5G, CDMA) are applicable to provide the cluster network. The communication outside the cluster, and enabled in each of the containers, may rely on the satellite and/or VSat features of the respective container's sub-system. As such, each sub-system first polls out to seek assignment of a position in the cluster network.

In an example, a first sub-system sends a signal with its identifier, its system time, its encryption status, its software status, and any related information deemed essential to recognize, acknowledge, and authenticate the sub-system. A handshake may be established by a second sub-system acknowledging the signal and providing a second signal with its own identifier. Thereafter, unless the first and the second sub-systems encounter signals with different identifiers, they do not respond. However, the first and the second sub-systems are capable of communicating more than identifiers once the handshake has been established and the sub-systems are now known sub-systems (known to each other, for instance). In an example, each sub-system maintains a log of other sub-systems, and time of each and every signal pinged out of the sub-system and received at the sub-system. For efficiency purposes, such a log may be able to determine significant events—such as a start of communication, a location ping, an established handshake, etc. In an example, a location ping may be used to triangulate the location of a node in the network by individual sub-systems. Other events may be regarded as insignificant and may be written over after a period of time. Thereafter at steady intervals, each sub-system may ping a sub-system to ensure that the known sub-system is still active and in the same state or same location (based on a comparison of the triangulation previous obtained with a new triangulation). In an aspect, the location and signal strength may be correlated so that the triangulation calculation need not be performed often—thereby saving resources and power. Location information may be garnered from the strength of the signal sensed from the known sub-system. In an implementation, once the sub-systems have known sub-systems, the cluster network formed from these sub-systems may communicate information. For example, when one sub-system is able to receive location information from a GPS update, it may relay this location information to the other sub-systems.

The cluster network forms a collection of electronic devices in each sub-system that are communicating with each other. As such, each sub-system may be a node. There are multiple nodes in the cluster that work together, and the nodes monitor, maintain consistency, and transfer information from one node to other as previously described. The cluster network may also poll to elect a responsible node that may head the cluster network for select external communications—such as GPS location. This may be done to preserve power or for data efficiency purposes in a single system. As such, any received information is shared to the other nodes. Further, all information from other nodes are required to be provided to the responsible node. The responsible node may also provide information outside the system—to the remote devices 265, 270, 275, for instance. This also efficient tracking of information and allow the system to operative effectively. In a further implementation, the GPS location may form a basis to transfer communication control between a mobile satellite system, VSat, and/or standard mobile phone communication. For example, when the GPS location is indicative of a proximity to a shore, a standard mobile phone communication sub-system is turned on and begins to handshake with a shore-based antenna to secure a communication channel. Thereafter, tracking is provided via the standard mobile phone communication sub-system. When a location obtained during a triangulation (for example), via the standard mobile phone communication sub-system, is indicative of the vessel moving away from the shore, then the standard mobile phone communication sub-system transfers control back to the mobile satellite system and/or VSat for GPS tracking and communication. Alternatively, each sub-system pings for a receiver at various time intervals and is able to turn on and request control internally when it has the strongest signals or when it has a preferred signal. Particularly, the standard mobile phone communication sub-system may be preferred from a price and technology view, while the VSat may be in a second preference with the mobile satellite system in a third preference.

Figure 3:
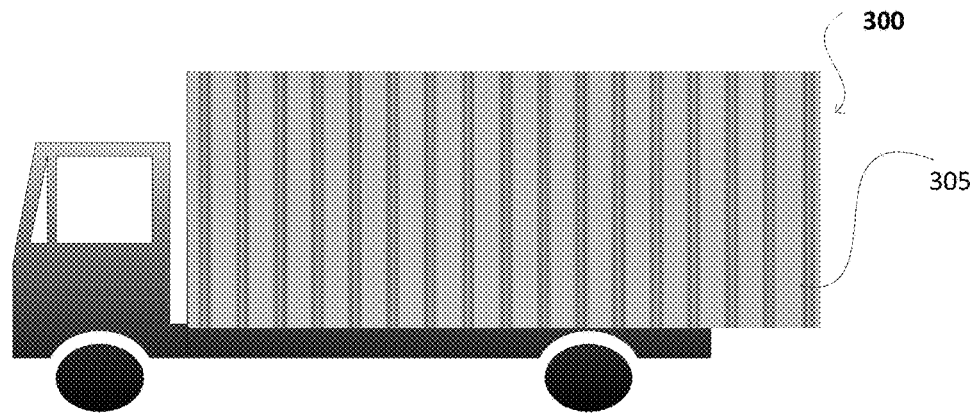
FIG. 3 illustrates an example container at one transfer stage and incorporating a cluster-based container lifecycle tracker in accordance with various embodiments.

FIG. 3 illustrates an example container 300 at one transfer stage and incorporating a cluster-based container lifecycle tracker in accordance with various embodiments. As illustrated, the container 305 is not required to be modified in any way. The present sub-system may be detachably installed to the inner portion of the container at approximately the container door area. FIG. 4 illustrates such an example 400 of a cluster-based container lifecycle tracker 410 installed in a container 405 at a transfer stage for tracking cargo 425, 435, 445. In an example, the transfer stage may be the cargo handler, the port side, or a distributor of the cargo. As such, the sub-system 410 is not required to be proprietary to the cargo handler, the port side, or a distributor, or even the vessel on which the cargo is transported. In an example, the cluster-based container lifecycle tracker 410 is a sub-system that, when networked with other similar sub-systems for a system of a cluster network. Sub-system 410 is provided with proprietary key-pair encoding to communicate with an administrator 270, 275, or to upload tracking information to cloud servers 265. In an example, the proprietary key-pair may be updated in a first communication with the sub-system 410, from the moment it is turned on to accept polling to participate in a cluster network. Such an update may be provided by a first communication via data communication systems 255, upon switching on the sub-system. Alternatively, an update to the key-pair may be forced at every instance of a stable data communications network.

In FIG. 4, tags 420A-420D may be picked up by a data retriever component of the sub-system 410. For example, the data retriever component may be an RFID reader, an NFC reader, or a barcode reader within the proximity of the tags 420A-420D. These readers may read the tags as the cargo 425, 435, 445 are moved into the container 405. The sub-system 410 is sufficiently close to the doors 415, but does not interrupt with the opening and the closing of the doors. The doors 415 need not be modified in the present implementation and the sub-system 410 would be placed in consideration of any latch system existing on the doors.

Further, when a forklift 430 moves pallet 440 with cargo into the container, the pallet 440 itself may include a tab 420C that may be read and may be correlated against a fixed amount of cargo 435. Each time the tag is read, the sub-system 410 is also configured to initiate a request for location information of the container (or the vessel). This way, when the door is opened or when the cargo is moved out, the sub-system 410 is able to capture an image of the environment, is able to capture information from the tag, and is able to capture location information of its geographic location (or the vessel's geographic location). As such, if the door is open mid-voyage for a theft under progress, plenty evidence is gathered and provided instantly to a remote device. Even if the tags are removed, prior to movement of the cargo, the image of the environment is captured and provided to the remote device, along with the location information. To prevent the sub-system from being compromised, the evidence gathered may be disbursed throughout the other sub-systems and stored in the sub-systems, the locations of which are not completely known to the entity committing the theft. For example, some containers may not be targeted in the theft and those containers may retain critical evidence shared from the container being targeted—even if the sub-system in that container is immediately damaged prior to transmitting information to a remote device.

In a further example, when the sub-system is outside of range, such as in a trans-oceanic voyage, each of the sub-systems may rely on the last provided key-pairs. The encryption is such that the other sub-systems recognize the keys provided by each sub-system in the group. In an example, the key-pair provides public keys for each sub-system during an update, and the public keys correspond to private keys of the respective sub-systems. Alternatively, a backup key-pair may be provided for backup communication when a determination is made that the key-pair existing in the sub-system is outdated. For example, during long voyages, it may be the case that a sub-system was not updated. However, it should also then be the case that the other sub-systems in a single system were also not updated, as they were all together during the voyage. In such a situation, the sub-systems continue to communicate with each other using the last updated key-pairs. When it is determined, however, that one sub-system is updated and others are not or that one sub-system is not updated, then the non-updated sub-systems may proceed to use the backup key pair for communication till it can receive a viable update, which also updates the backup key pair. As such, the initial communication, during polling by any of the sub-systems may include each sub-system providing their identifier, and then (or concurrently) providing supporting information such as the key-pair (encryption information), including version, date, and lifetime available, as well as current time information to ensure that all sub-systems are clocking similarly.

Figure 5:
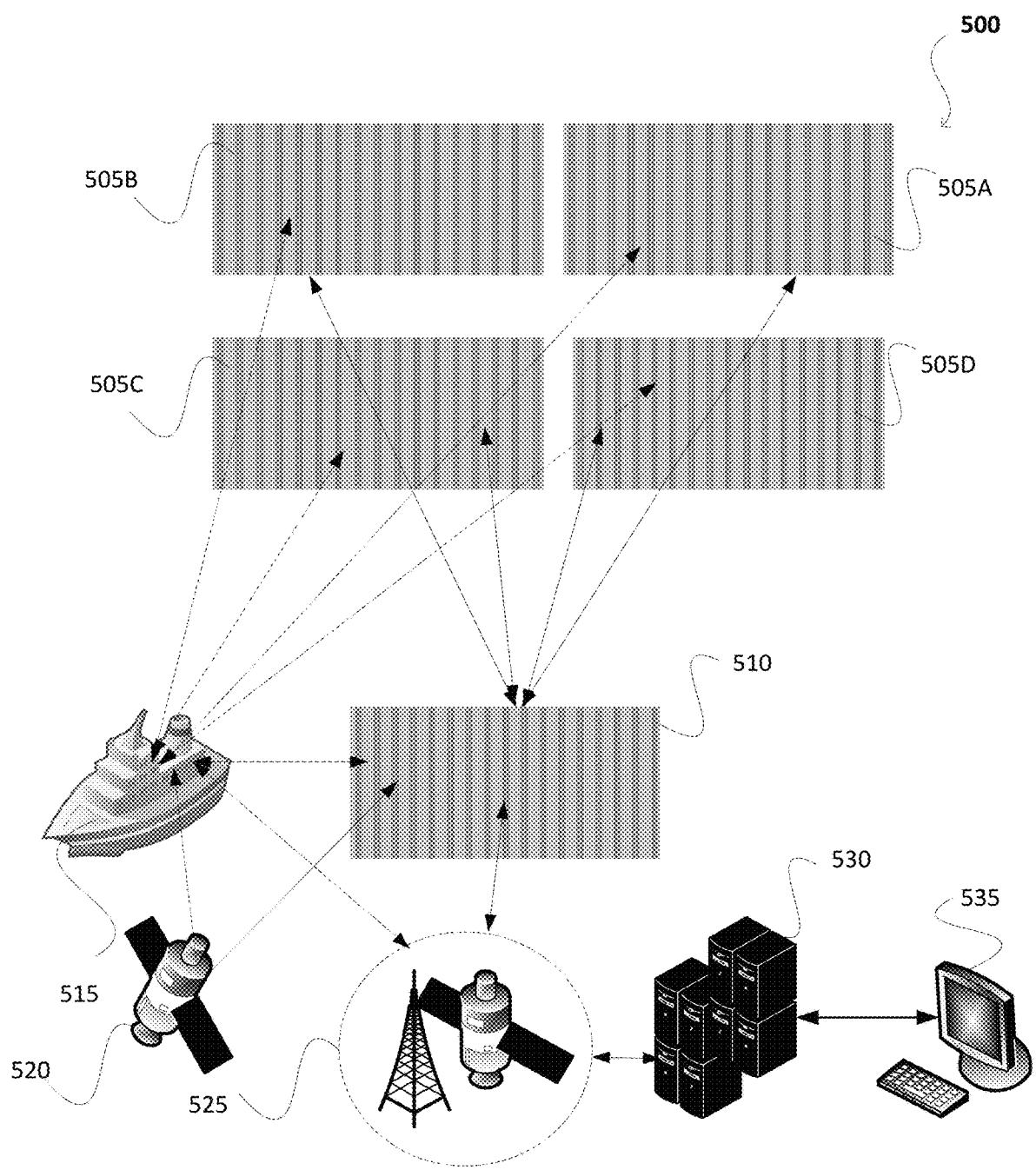
FIG. 5 illustrates an example cluster-based container lifecycle tracking, in accordance with aspects of this disclosure.
Figure 6:
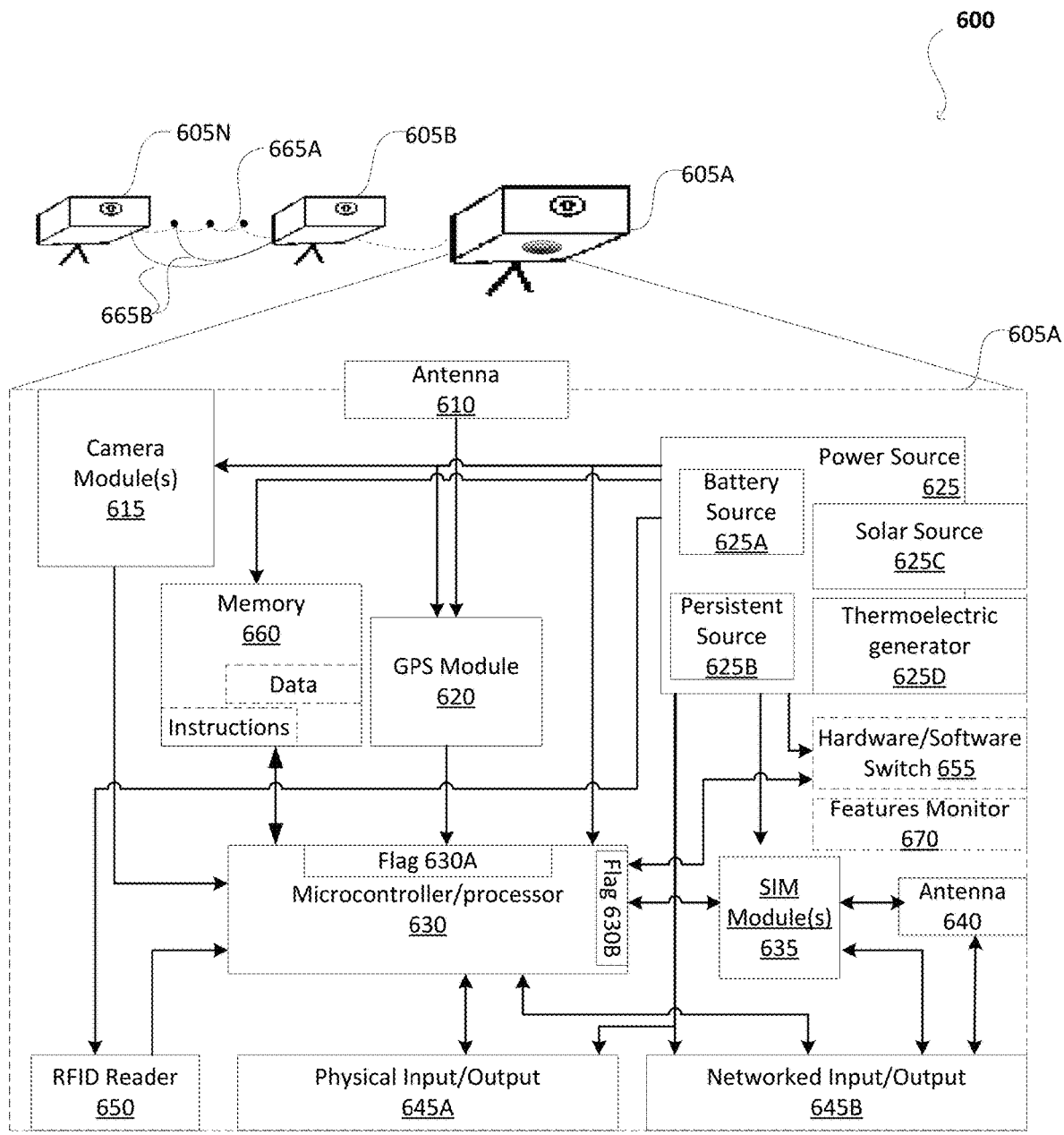
FIG. 6 illustrates an example system of cluster-based container lifecycle tracking, in accordance with aspects of this disclosure.

FIG. 5 illustrates an example 500 cluster-based container lifecycle tracking, in accordance with aspects of this disclosure. In a vessel 515 including five containers 505A-505D and 510, the sub-systems in each of containers 505A-505D and 510 may for part of a cluster network within the vessel 515. In an alternate implementation, multiple cluster networks may exist within the vessel depending on their proximity and depending on the size of the vessel. For simplicity, reference to the containers 505A-505D and 510 is a reference to respective sub-systems in these containers, unless otherwise stated. In the example of FIG. 5, a sub-system in container 510 is polled with sub-systems in containers 505A-D and a cluster network is established for these containers. Container 510 may be designated as a responsible node in the cluster network. As such, FIG. 5, in one aspect, provides bold lines for an implementation of the cluster network of the containers 505A-505D with responsible node as container 510. It is also appreciated that information shared between the nodes—e.g., the signal strength of container 510, the power remaining and access to power resources, as well as the software status (key-pair validity, update date, and time)—may contribute to a determination of the responsible node among the available nodes in a cluster network.

In an example, while the responsible node is solely a designation to save resources in a cluster environment, a person of ordinary skill, upon reading the present disclosure will understand that the individual nodes may include instructions to perform their own communication outside the cluster network (to users 535 and cloud servers 530 and in the event that a polling to the responsible node does not secure a response. In addition, such a communication may include the status of other nodes in the cluster network. Such a communication may also be provided from the responsible node at intervals outside of when the container doors are opened, for instance. In another aspect of this disclosure, a protected setup system may be provided in each sub-system to allow a manual input to trigger the sub-system into a responsible node position. In addition, the protected setup may function in accordance with the Wi-Fi Protected Setup (WPS) standard, which allows connection to multiple devices from a router. In the present implementation, the sub-systems include multiple modem chips capable of supporting multiple (and simultaneous) wireless connections. As such, the responsible node is able to provide network for the other nodes in the cluster network, once the cluster network is established.

FIG. 5 also illustrates an example 500 (reference to the dotted lines) that a sub-system may be permanent deployed on the vessel 515. As such, in another aspect, a cluster network may be formed with the sub-system of the vessel 515 and the sub-systems from any containers 505A-505D and 510 that are loaded on the vessel 515. The sub-system on vessel 515 may then be a more powerful variant of the sub-system—with wide ranging wireless capability that may be supported by repeaters throughout the vessel 515. In an example, the sub-system on vessel 515 may include a constant power source and may be the designated responsible node for the cluster network at all times. In both embodiments of FIG. 5, the GPS satellite 520 provides GPS position information at designated intervals or at requested times. Such GPS position information is illustrated as provided to the sub-system on the vessel 515 or the sub-system on container 510. However, the GPS position information is available to any of the requesting sub-systems, and the requesting sub-systems may then share the GPS position information with its counterparts in the cluster network, forming a system. All external communications to the cloud server 530 and user 535 may be via the communications networks 525, which may be by radio, satellite, and mobile broadband communications.

FIG. 6 illustrates an example system 600 of cluster-based container lifecycle tracking, in accordance with aspects of this disclosure. FIG. 6 illustrates multiple sub-systems 605A, 605B . . . 605N, each illustrates as being in a cluster network with each other via bold lines 665B or daisy chained, via dotted lines 655A. The illustration of FIG. 6 is merely for example purposes and appropriate clustering designed fit for a specific number of sub-systems may be available to provide a system for cluster-based container lifecycle tracking. In FIG. 6, the sub-system 605A is further illustrated as including multiple components. A person of ordinary skill in the art would understand that other components that not shown are readily understood as part of the sub-system 605A or as readily available to perform functions with the sub-system 605A, and that not all components are shown, but also that such understanding is made upon reading the present disclosure.

In the example 600 of FIG. 6, the sub-system 605A includes antenna 610 for GPS module 620; camera module(s) 615; power source 625 (including non-rechargeable or rechargeable batteries 625A, persistent source 625B—plug-in, generator, alternator, etc.—solar source 625C, and thermoelectric generator 625D); microcontroller/processor 630; SIM module(s) 635 and its supporting antenna 640; networked input/output 645B (including a network interface card (NIC), WPS components, and standard support chips for wireless broadband, Wi-Fi, and satellite communications); physical input/output 645A (including one or more of keyboard, access card readers, alphanumeric inputs, touchscreen inputs, retina input, and voice input for the input aspects, and display, voice readout, or haptic feedback for the output aspects); RFID reader 650; features monitor 670 (for environment within the container—such as moisture, temperature, etc.); and hardware/software switch 655 for activating the microcontroller/processor 630 from any state in which it may be.

In the example 600 of FIG. 6, the microcontroller/processor 630 forms the at least one local processor, with memory 660 including an instructions area and a storage area. The instructions area is updateable via remote updates to the networked input/output module 645B, while local updates are also possible via physical input/output module 645A. In an example, Cat5, Cat5e, Cat6, Fiber Optic Adapters, Firewire® Connectors, Modular Jacks, Modular Plugs, or USB Connectors are provided as part of the physical input/output module 645A. The instructions when executed on the microcontroller/processor 630 causes the system in example 600—i.e., sub-systems 605A-605N—to perform functions as described throughout the disclosure. Further, reference numerals 665A and 665B are provided to illustrations of the types of wireless interconnectivity obtained from in the system of example 600. The cluster network may allow all sub-systems to communicate with each other (e.g., reference numeral 665B, or may allow a daisy chain 665A of communications, but may not restrict communications through each node. In an example, the communications may include a header with the destination node identifier. In an example, short forms of the identifier for each node may be used as the system is limited to the size of the vessel, so a chance of confusion is decreased.

FIG. 6 illustrates the at least one remote processor in any one of sub-systems 605B-605N. A person of ordinary skill reading this disclosure would recognize that each of sub-systems 605B-605N have the remote processor. As each sub-system 605B-605N also includes at least one environment camera (e.g., module 615), at least one data retrieving component (e.g., RFID reader 650); at least one satellite receiver (e.g., GPS module 620); at least one transmitter or transceiver (e.g., physical input/output 645A or networked input/output 645B); and at least one memory (e.g., memory 660) including instructions that are available for execution in the at least one local processor cause the system 600, including sub-system 605A, to perform functions described throughout this disclosure. The instructions are provided in the descriptive form throughout this disclosure, and in the flowchart of FIG. 7. The instructions breathe life into the system 600 by bringing together the various components of sub-system 605A (and of each of the other sub-systems), but also to allow the sub-systems to network together. Further, as used herein, the at least one transmitter or transceiver (e.g., physical input/output 645A or networked input/output 645B) incorporates semiconductor-based chips to process and package data into a bit stream for 3G, 4G, LTE, 5G, CDMA, satellite, or Wi-Fi based transmission, but also includes the physical modules for transmitting the information. In an example, the antenna 640 provides direct or indirect (via SIM module 635) access for such transmission.

The microcontroller/processor 630 executes the instructions from memory 660 to perform a determination that the system is activated by an opening or a closing of a container door. This may be by a trigger from the at least one remote processor (e.g., in containers 605B-605N). In addition, this may be by a physical manipulation of an example hardware switch 655, except that the physical manipulation is as to a similar switch in containers 605B-605N. Such a manipulation may be a movement of the door past a predetermined limit from its closed position or an opening of a lock or a latch. Alternatively, a software switch may be used—such as a motion detector, an infrared detector, a noise detection, etc. Once the hardware/software switch of the at least one remote processor is activated, the above referenced determination, that the system is activated, occurs. Further, the instructions cause activation of at least one environment camera (in the container with the open door) to provide an environment image and cause at least one data retrieving component (in the same container) to provide data associated with a tracking marker of cargo associated with the container, the environment image and the data provided to the at least one local processor. The environment image and the data are provided to the at least one local processor. The instructions then cause activation of the at least one satellite receiver to receive location information for the at least one local processor. Tracking information is packaged, either by microcontroller/processor 630 or a processing chip in the input/output component 645B. The tracking information includes one or more of the environment image, the data, and the location information for a bit stream using the input/output component 645B. Thereafter, the instructions cause the microcontroller/processor 630 to imitate the input/output component 645B to communicate the bit stream to a remote device when the input/output component 645B is provided with access for the communicating.

FIG. 6 also illustrates that thermoelectric generator 625D is available to provide power source 625—this may be an attachment of a thermocouple against the metal frame of the container and using a change in a temperature endured by walls of the container, during the voyage, to charge the battery source 625A, or to directly supply power. Alternatively, a solar source 625C may be provided external to the container with a capacitive or inductive coupling for trickle charge to battery source 625A, or to the remaining sub-system components within the container. A miniature wind turbine is available in a similar manner—located external to the container but allowing for capacitive or inductive coupling for a trickle charge to the battery source. Furthermore, refrigerated containers support charging options for charging the battery source 625A. Wireless charging from within the refrigerated container to an external lock can provide the trickle charge for the battery source over extended voyages. As such a wireless charge transmitter is provided from a power point of the refrigeration unit of the refrigerated container and a lock or the sub-system of the present disclosure, each includes a wireless charge receiver to receive the charge signals and to trickle charge or charge the battery source. The battery source may also be removed and replaced at a subscription fee or under guarantee of services as part of a subscription or activation the use of the present tracking services.

Figure 7:
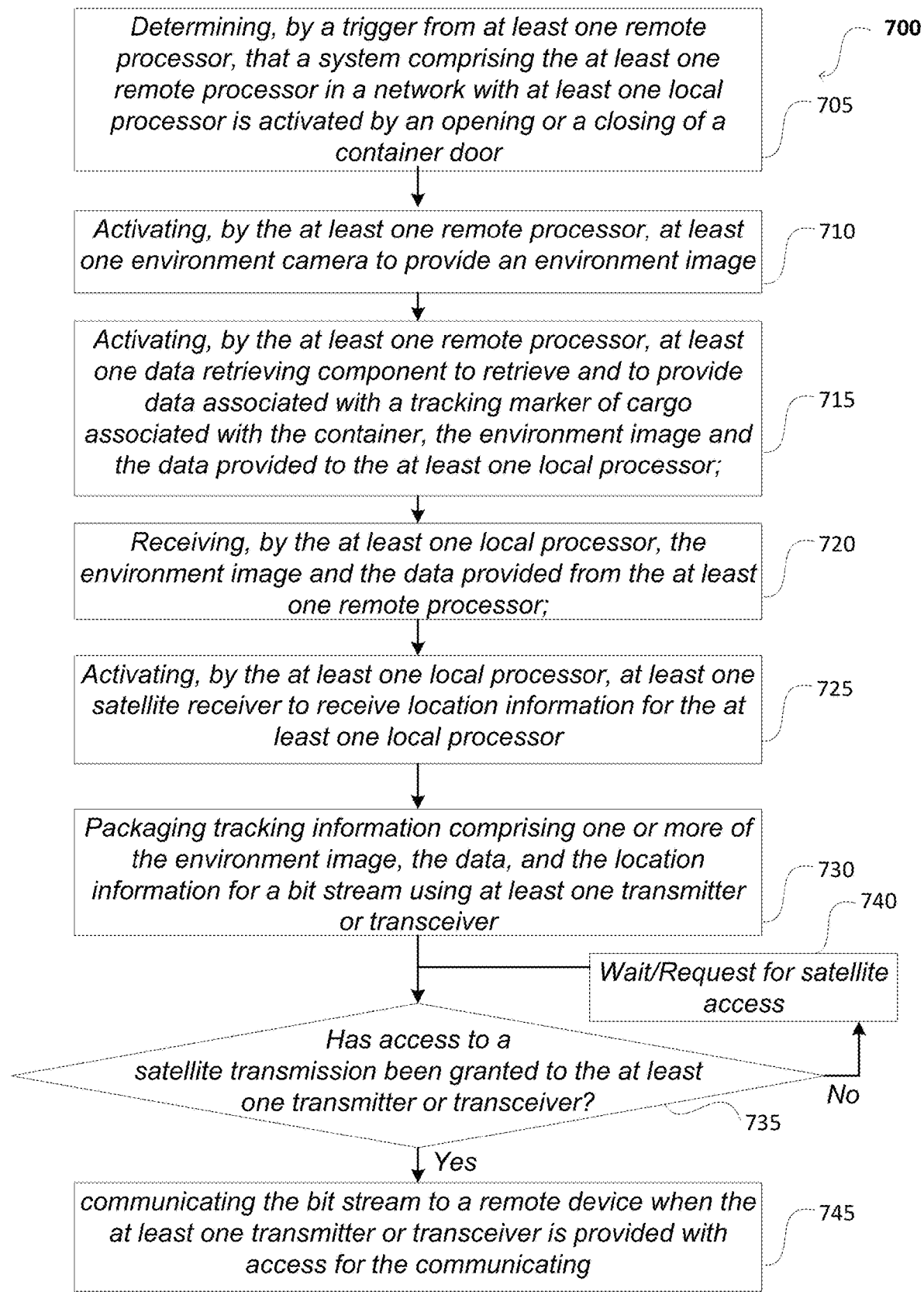
FIG. 7 illustrates an example method of cluster-based container lifecycle tracking, in accordance with aspects of this disclosure.

FIG. 7 illustrates an example method 700 of cluster-based container lifecycle tracking, in accordance with aspects of this disclosure. Sub-process 705 provides a feature for determining, by a trigger from at least one remote processor, that a system comprising the at least one remote processor in a network with at least one local processor is activated by an opening or a closing of a container door. In sub-process 710 an activating feature occurs, by the at least one remote processor, for at least one environment camera to provide an environment image. In sub-process 715 another activating feature is by the at least one remote processor for at least one data retrieving component to retrieve and to provide data associated with a tracking marker of cargo associated with the container. The environment image and the data are provided to the at least one local processor. Sub-process 720 receives, by the at least one local processor, the environment image and the data provided from the at least one remote processor. In sub-process 725, activation by the at least one local processor occurs, so that at least one satellite receiver is activated to receive location information for the at least one local processor. Sub-process 730 performs packaging for tracking information that includes one or more of the environment image, the data, and the location information for a bit stream using at least one transmitter or transceiver. Sub-process 735 determines whether access has been granted for satellite transmission to the at least one transmitter or transceiver. When such access has been granted, sub-process 745 communicates the bit stream to a remote device. When such access is pending, sub-process 740 waits or performs further steps to request for the satellite access. In an alternate implementation, video access is provided at certain predetermined times, which may be different from times at which image capture is provided. For example, during the packing of the containers, capturing of data images may be activated, while when the lock is set or the container is locked, the capturing of videos or burst images, at a predetermined time range or periods, is activated.

As such, the above implementations describe a system, sub-systems, and a method where an onboard device—the system on a container of a vessel—can transmit location and container security information to a remote device via a satellite. The satellite communicates with the remote device via a cell phone connection, where available, and to a computer network, such as the Internet. The system can also communicate by short-range wireless connection when it is within range of a fixed communications device or a cell tower. For example, such a connection may be a tethered connection that uses fixed communications device, such as cell phone signal to connect to a cell phone tower, which in turn communicates with the remote device via a computer network from the cell service provider. Alternatively, the system herein can communicate directly using cell signal (via the SIM module) and its associated cellular telephone tower. The cell phone or other handheld device, when applicable, may include any portable device with a cell service, such as a personal digital assistance (PDA). Further, the handheld device may be used to initialize and update the onboard device—such as to update key-pairs, to initiate the cluster network, to select the responsible node, etc.

When loading of the container is completed, a manifest of loaded goods, bill of lading, purchase order, shipping order, commercial invoice information, packing list, forwarder's cargo receipt (FCR) and a pre-planned routing guide for shipping the container may be communicated from the handheld device to the sub-system. The doors of the container are then closed. A "close door" command is selected in the handheld device, initiating the transmission of a command to the sub-system that the container is complete and that the sub-system may proceed to, at intervals, seek to join a cluster network. The physical doors of the containers may be closed by the operator at the same time.

The sub-system recognizes the door closing and, if all is okay, a "doors closed successfully" message is transmitted to the handheld device. In another implementation, the sub-system is part of a lock attached to the container. The container is now closed and the sensors—including the environment camera and the data retrieval component are armed. Unauthorized opening of the container will result in an intrusion alert by way of the discussed media and data provided to a remote device. In another example, activation of a door close switch and/or other built-in sensors (e.g., movement, sound, impact, or light detecting sensors), cause the sub-system to determine that the doors of the container are closed and to enters into an "armed" state. As such, a "close door" command is not required. All the sensors are then alert to container conditions, such as appearance of light, change in humidity, change in temperature and vibration. The sub-system may transmit an alert via satellite and/or phone connection if a sensor input exceeds pre-defined thresholds or, in another implementation, if the container position deviates from a pre-planned routing guide by predetermined thresholds (e.g. geographic position, duration of transport between locations or vibration in part of the routing where vibration is not expected). This implementation allows for other monitoring aspects outside the door activation aspect.

The system herein provides container security including at least the following features: (1) container monitoring at all times; (2) pre-screening of containers before they arrive at ports; (3) using continuous monitoring technology to pre-screen high-risk containers; and (4) supporting development of smart and secure containers; (5) establishing security criteria to identify high-risk containers; (6) cargo monitoring at all times; (7) supporting customs requirements of each country; (9) supporting weight inspection for cargo and container restrictions (e.g., embedded into the tracking information placed on the cargo at the time the cargo is sealed or an augmented reality feature allowing the camera in each sub-system to track location of corners for the dimensions of each package and a weight scale in the container tracking a weight of each added cargo to the container for the sub-system); (10) temperature and humidity monitoring. The shipping containers of the present disclosure are therefore configured to include sensors for detecting hazardous conditions associated with the shipping containers. In accordance with an embodiment, the container also includes other sensors operative to sense conditions within the shipping container and to transmit this information. In addition to temperature and humidity, this may include carbon dioxide, infra-red emissions and temperature. The hazardous condition sensed by any shipping container on a ship may also be transmitted through the network to a satellite transmitter and/or a radio transmitter for reporting to the remote device. In addition, even though the examples herein provide an implementation of board ships, a person of ordinary skill would recognize that the implementation in the containers may be applied to containers shipped via trains or trucks.

The container may also include a shipping container body having associated modified doors to support sensor—such as an internal component attached to the physical hinges to trigger a switch for the associated sub-system. The transmitter or transceiver may, alternatively, be mounted in a secure location of the sub-system, with the sub-system located outside the shipping container. As such, the sub-system is operative to wireless transmit information to a remote monitor regarding the status of an electronic device has a locking sensor element for confirming locking the doors. This may be by the environment camera located within the sub-system capturing an image at the time of locking.

Example environments discussed herein for implementing aspects in accordance with various embodiments may include web-based environments for remotely providing data collected by the measurement devices and/or the measurement probes. Different environments may be used, as appropriate, to implement various embodiments. The devices in the figures, for example, that are used to interact with various embodiments for data collection and transmission can include any appropriate device operable to send and receive requests, messages, or information over an appropriate network and convey information back to a user of the device. The network to connect these devices can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood from the present disclosure that there can be several application servers, layers, or other elements, processes, or components, which may be chained or otherwise configured, which can interact to perform tasks as discussed and suggested herein. As such the data herein may be stored in a data store for later transmission or buffered for continuous transmission. Such a data store refers to any device or combination of devices capable of storing, accessing, and retrieving data, which may include any combination and number of data servers, databases, data storage devices, and data storage media, in any standard, distributed, or clustered environment. The handling of all requests and responses, as well as the delivery of content between devices and receiving resources, can be handled by intermediate server.

A data store, as used herein, can include several separate data tables, databases, or other data storage mechanisms and media for storing data relating to a particular aspect. The data store is operable, through logic associated therewith, to receive instructions from a server, and obtain, update, or otherwise process data in response thereto. In one example, the data store is available for searching of the collected data. A user might submit a search request for a certain type of the collected data. In this case, the data store might access the user information to verify the identity of the user, and can access the collected data to obtain information for the search request. The information then can be returned to the user, such as in a results listing on a web page that the user is able to view via a browser on a user device. Information for particular collected data can be viewed in a dedicated page or window of the browser.

Each device referenced above, including servers, may include an operating system that provides executable program instructions for the general administration and operation of that server, and may include a non-transitory computer-readable medium storing instructions that, when executed by a processor of the devices or servers, allow the devices or servers to perform its intended functions. Suitable implementations for the operating system and functionality of the servers are readily understood upon reading the present disclosure.

The environment in FIG. 5 may be, in one embodiment, a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or web service, such as may be part of a service-oriented architecture. Services such as web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In embodiments utilizing a server, the server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python®, or Tool Command Language (TCL), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices may also include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   at least one local processor in a first container and at least one remote processor in a second container, the first container and the second container to be on a same voyage;
   at least one environment camera;
   at least one data retrieving component;
   at least one satellite receiver;
   at least one transmitter or transceiver; and
   at least one memory including instructions that when executed in the at least one local processor cause the system to:
   determine, by a trigger from the at least one remote processor, that the system is activated by an opening or a closing of a door of the second container;
   activate the at least one environment camera to provide an environment media and the at least one data retrieving component to retrieve and to provide data associated with a tracking marker of cargo associated with the second container, the environment media and the data provided to the at least one local processor;
   activate the at least one satellite receiver to receive location information for the at least one local processor;
   package tracking information comprising one or more of the environment media, the data, and the location information for a bit stream using the at least one transmitter or transceiver; and
   communicate the bit stream to a remote device when the at least one transmitter or transceiver is provided with access for the communicating.

2. The system according to claim 1, wherein the at least one local processor and the at least one remote processor are detachably installed in the first container and in the second container on a vessel associated with the same voyage.

3. The system according to claim 1, wherein the at least one local processor and the at least one remote processor are networked together to form a cluster network for sharing the environment media, the data, and the location information.

4. The system according to claim 1, wherein the at least one local processor and the at least one remote processor are networked together with each having an assigned internet protocol address or each having an assigned media access control (MAC) address.

5. The system according to claim 1, wherein the bit stream is encrypted with a private-public key-pair encryption and provided to the remote device that is capable of using a corresponding key-pair for decryption of the bit stream.

6. The system according to claim 1, further comprising at least one power module of a battery power source and a renewable power source, the renewable power source being at least one of solar cells, a thermoelectric generator, or a miniature wind turbine.

7. The system according to claim 1, wherein the at least one local processor and the at least one remote processor are networked together, along with other remote processors, to form a cluster network, and wherein the at least one local processor is a responsible processor in the cluster network, the responsible processor identified by at least one of: a manual setting, a strongest signal default setting for receiving a strongest or a most reliable satellite signal, a location setting for being most accessible, a first device setting for being a first device activated in the cluster network, and a polling from each processor in the cluster network.

8. The system according to claim 1, wherein the at least one transmitter or transceiver is a semiconductor component supporting one or more of: 3G, 4G, LTE, 5G, Global System for Mobile Communications (GSM®), Code Divisional Multiple Access (CDMA), or a satellite communication standards for communicating the bit stream.

9. The system according to claim 1, wherein the satellite receiver is a global positioning system (GPS) satellite receiver.

10. The system according to claim 1, wherein the at least one remote processor further comprises a hardware switch or a software switch, the hardware switch or the software switch responsible for waking the at least one remote processor from any low power mode, and responsible for the activation of the at least one environment camera and the at least one data retrieving component.

11. A method comprising:
    determining, in a system comprising at least one local processor in a first container and at least one remote processor in a second container, that the system is activated by a trigger from the at least one remote processor on an opening or a closing of a door of the second container, the first container and the second container to be on a same voyage;

activating, by the at least one remote processor, at least one environment camera to provide an environment media;

activating, by the at least one remote processor, at least one data retrieving component to retrieve and to provide data associated with a tracking marker of cargo associated with the second container, the environment media and the data provided to the at least one local processor;

receiving, by the at least one local processor, the environment media and the data provided from the at least one remote processor;

activating, by the at least one local processor, at least one satellite receiver to receive location information for the at least one local processor;

packaging tracking information comprising one or more of the environment media, the data, and the location information for a bit stream using at least one transmitter or transceiver; and communicating the bit stream to a remote device when the at least one transmitter or transceiver is provided with access for the communicating.

12. The method according to claim 11, wherein the at least one local processor and the at least one remote processor are detachably installed in the first container and in the second container on a vessel associated with the same voyage.

13. The method according to claim 11, further comprising:

providing a local network comprising the at least one local processor and the at least one remote processor, the local network forming a cluster network for sharing the environment media, the data, and the location information;

determining, at a time of the trigger, that the at least one local processor is positioned to transmit outside the cluster network; and providing the at least one local processor with the environment media, the data, and the location information.

14. The method according to claim 11, wherein the at least one local processor and the at least one remote processor are networked together with each having an assigned internet protocol address or each having an assigned media access control (MAC) address.

15. The method according to claim 11, wherein the bit stream is encrypted with a private-public key-pair encryption and provided to the remote device that is capable of using a corresponding key-pair for decryption of the bit stream.

16. The method according to claim 11, further comprising:

providing at least one power module of a battery power source and a renewable power source, the renewable power source being at least one of solar cells, a thermoelectric generator, or a miniature wind turbine.

17. The method according to claim 11, further comprising:

providing a cluster network comprising the at least one local processor and the at least one remote processor, and at least one other remote processor;

setting the at least one local processor as a lead processor in the cluster network, the lead processor provided with an external communication identifier to transmit the bit stream to the remote device, the lead processor identified by at least one of: a manual setting, a strongest signal default setting for receiving a strongest or a most reliable satellite signal, a location setting for being most accessible, a first device setting for being a first device activated in the cluster network, and a polling from each processor in the cluster network.

18. The method according to claim 11, wherein the at least one transmitter or transceiver is a semiconductor component supporting one or more of: 3G, 4G, LTE, 5G, Global Method for Mobile Communications (GSM®), Code Divisional Multiple Access (CDMA), or a satellite communication standard for communicating the bit stream.

19. The method according to claim 11, wherein the satellite receiver is a global positioning method (GPS) satellite receiver.

20. The method according to claim 11, further comprising:

providing the at least one remote processor with a hardware switch or a software switch, the hardware switch or the software switch responsible for waking the at least one remote processor from any low power mode, and responsible for the activation of the at least one environment camera and the at least one data retrieving component.

* * * * *